United States Patent

Wang et al.

[11] Patent Number: 5,862,378
[45] Date of Patent: Jan. 19, 1999

[54] PASSING ARRAYS TO STORED PROCEDURES

[75] Inventors: I-Shin Andy Wang; John Luen Ng; Judianto Sidik, all of San Jose; Frederick Thomas Sharp, Menlo Park, all of Calif.

[73] Assignee: International Business Machines Corporation, Armonk, N.Y.

[21] Appl. No.: 656,442

[22] Filed: May 31, 1996

[51] Int. Cl.⁶ ............................................. G06F 9/44
[52] U.S. Cl. ..................... 395/701; 395/702; 707/102
[58] Field of Search ................... 395/702, 703, 395/708, 712, 701, 800.1, 800.11, 800.16, 800.18; 707/102, 200

[56] References Cited

U.S. PATENT DOCUMENTS 5,469,574  11/1995  Chang et al. ........................... 395/702
5,689,709  11/1997  Corbett et al. ........................... 395/683

*Primary Examiner*—Thomas Peeso
*Attorney, Agent, or Firm*—Merchant, Gould, Smith, Edell, Welter, & Schmidt

[57] ABSTRACT

A method, apparatus, and article of manufacture for passing a VisualBasic array argument to an SQL stored procedure executed by a computer. The VisualBasic array is first created in the memory of the computer and comprises an object. The array is then passed to a C or C++ function in the memory of the computer. The function to which the array is passed is declared as an alias for another function within VisualBasic. Execution of the function by the computer returns a handle for the passed array. Finally, the handle is passed to the SQL stored procedure in the memory of the computer, and is accessed by the stored procedure during execution by the computer.

12 Claims, 6 Drawing Sheets

PASSING ARRAYS TO STORED PROCEDURES

BACKGROUND OF THE INVENTION

1. Field of the Invention

This invention relates in general to memory management and programming techniques performed by computers, and in particular, to a method, apparatus, and article of manufacture for passing of arrays to stored procedures.

2. Description of Related Art

Stored procedures are collections of pre-defined procedural code that typically employ SQL to access databases. There are a number of benefits in using stored procedures, including function encapsulation, performance enhancement, client-server processing, and security. Stored procedures are not unlike procedures found in other high level languages, in that they can be passed input and output parameters. Generally, stored procedures may take any number of parameters, which are defined internally within the procedure.

Generally, a programmer explicitly invokes stored procedures in an interactive environment, but such procedures can also be executed or invoked by other programs. However, there may be a problem in passing parameters between an invoking program and a stored procedure because of the differences in the format of the data recognized by each.

For example, a common structure for representing data is an array. An array is a set of pairs, corresponding to an index and a value. Arrays are typically implemented as a consecutive set of memory locations, which facilities the calculation of an index and corresponding value pair. Often, it is desirable to pass arrays to stored procedures.

A problem arises, however, in passing VisualBasic arrays to SQL stored procedures. VisualBasic stores arrays as objects, and these objects do not conform to parameter passing standards for SQL stored procedures. Stored procedures generally expect to be provided with a handle for the array.

Handles refer to objects that are managed by the Microsoft Windows environment. Handles comprise a 32-bit integer value that identifies an object in a WIN32 environment (or alternatively, a 16-bit integer value in a WIN16 environment). The use of handles insulates the application from various aspects of object management. However, not only are there many different types of objects, but they differ dramatically in how they are used and the types of requirements and restrictions that one must follow when using them.

Passing an array from a VisualBasic program to an SQL stored procedure is problematic, because the SQL stored procedure does not recognize the VisualBasic array structure. Thus, passing VisualBasic arrays to SQL stored procedures can lead to compiler errors, or erroneous results resulting from invalid conversions or alignment problems. Therefore, there is a need in the art for a way to pass an array from VisualBasic to an SQL stored procedure.

SUMMARY OF THE INVENTION

To overcome the limitations in the prior art described above, and to overcome other limitations that will become apparent upon reading and understanding the present specification, the present invention discloses a method, apparatus, and article of manufacture for passing a VisualBasic array argument to an SQL stored procedure executed by a computer. The VisualBasic array is first created in the memory of the computer and comprises an object. The array is then passed to a C or C++ function in the memory of the computer. The function to which the array is passed is declared as an alias for another function within VisualBasic. Execution of the function by the computer returns a handle for the passed array. Finally, the handle is passed to the SQL stored procedure in the memory of the computer, and is accessed by the stored procedure during execution by the computer.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The preferred embodiment of the present invention provides a straightforward means for passing information between two different information environments, that of a programming environment, such as VisualBasic, and that of a stored procedure, such as Structure Query Language (SQL) used with a relational database. Specifically, a set of automation tools are provided to enable a user to pass information in an array format from a VisualBasic program to an SQL stored procedure, even though the SQL stored procedure does not recognize the VisualBasic array format. The invention provides a straightforward user interface that the user declares an alias dynamic link library (DLL) function to an "ADDR" function first, then passes the array as an argument to alias function. The returned value from the alias function returns a value which becomes an argument to the universal object link embedding (OLE) stored procedure interface within the Microsoft Windows graphical user interface (GUI) environment.

The ADDR function retrieves the handle for a VisualBasic array. It returns the handle back to the VisualBasic program where it can be used to access the associated memory location. The input to the ADDR function is a VisualBasic object, in this case an array, and the output is the address of the VisualBasic object. The object is passed to the ADDR function and the handle is returned as the result of that function. A handle, as that term is known in the art, is an identifier used within the windows operating system to identify memory locations, it is in essence a parameter passed to a windows applications programming interface (API) in order to retrieve or identify the actual data. This function allows windows to manage memory before application without the applications knowing where specifically certain elements are located in the memory. Once the handle of the VisualBasic array has been obtained, that can be passed directly into the stored procedure via a runtime parameter. In this manner, the stored procedure can use the standard Windows handle for the array, rather than the non-standard VisualBasic encapsulation for the array. VisualBasic does not allow the passing of the array directly into the stored procedure. If such attempt was made a compiler error would occur. However, the handle can be passed directly to the stored procedure via the VisualBasic call.

HARDWARE ENVIRONMENT

Figure 1:
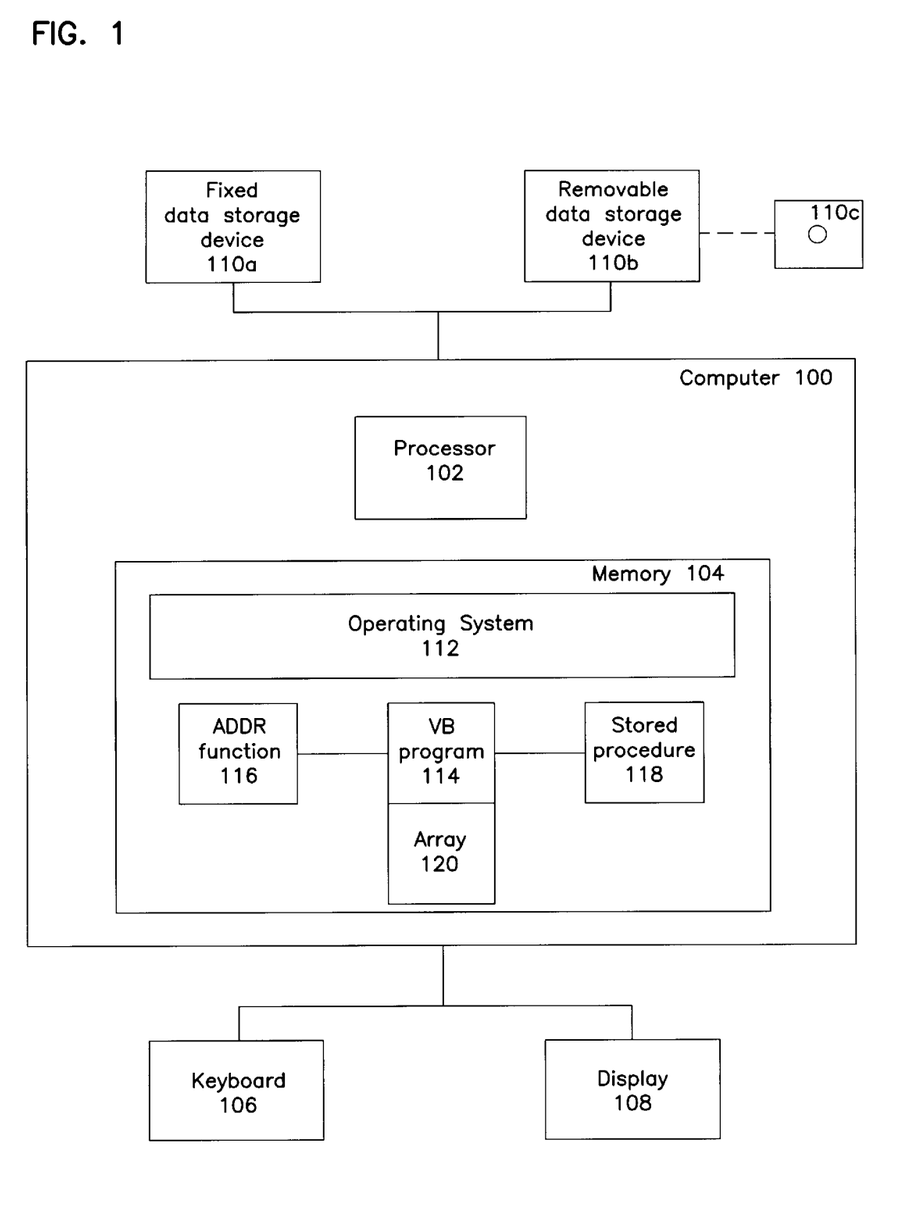
FIG. 1 is a block diagram that illustrates an exemplary hardware environment of the present invention.

FIG. 1 is a block diagram that illustrates an exemplary hardware environment of the present invention. The present invention is typically implemented using a computer 100 comprised of a processor 102 and memory 104. It is envisioned that attached to the computer 100 may be a keyboard 106, monitor 108, and data storage devices 110a–c, such as fixed data storage devices 110a, removable data storage devices 110b, and media therefore 110c. The personal computer 100 operates under the control of a operating system 112.

The present invention is preferably implemented using one or more computer programs 114, 116, 118, and data structures 120 stored in the memory 104. Generally, the computer programs 114, 116, 118, and data structures 120 are tangibly embodied in a computer-readable medium, e.g. one or more of the fixed and/or removable data storage devices 110a–b and/or media 110c. Under control of the operating system 112, the computer programs 114, 116, 118, and data structures 120 may be loaded from the data storage devices and media 110a–c into the memory 104 of the computer 100. The computer programs 114, 116, and 118 all comprise instructions which, when read and executed by the computer 100, causes the computer 100 to perform the steps necessary to execute the steps or elements of the present invention.

DATA FLOW EXAMPLE

Figure 2:
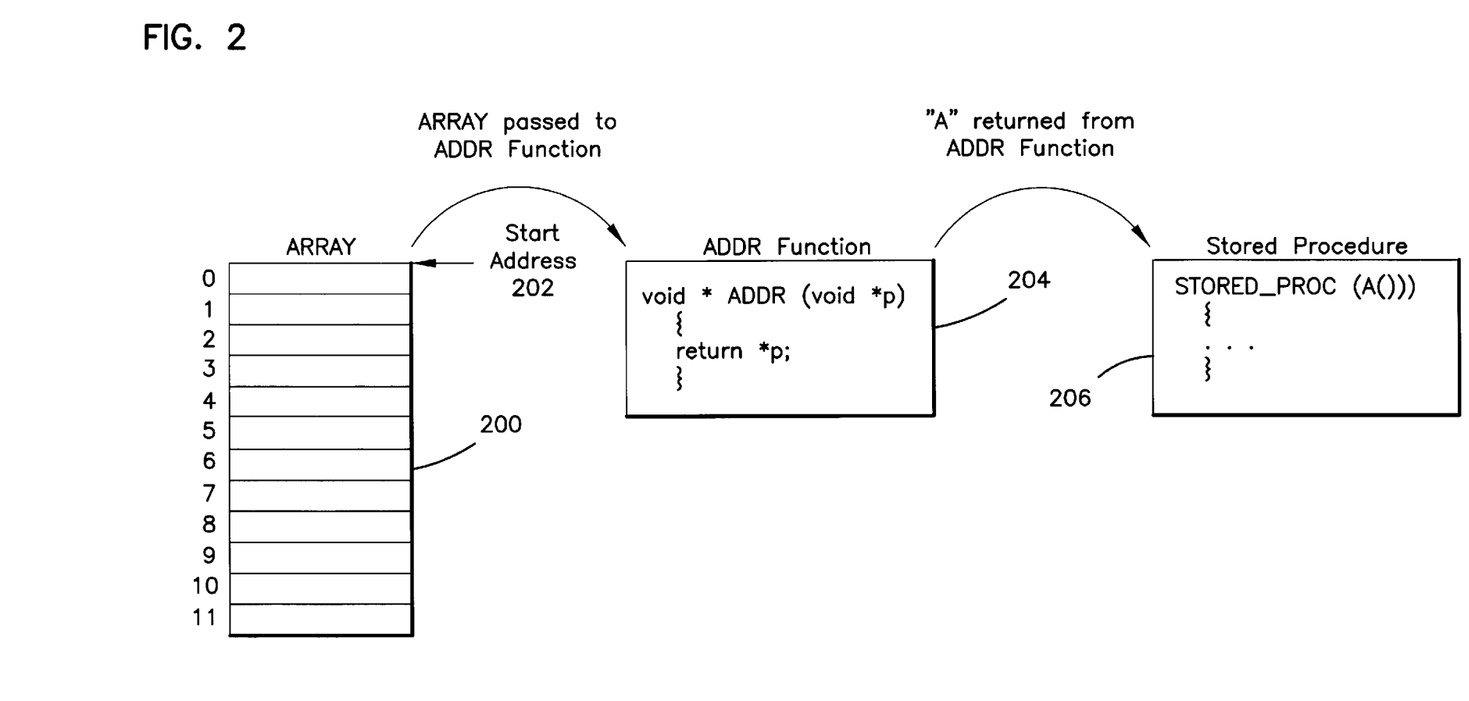
FIG. 2 is a data flow diagram illustrating the interaction when passing arrays to stored procedures according to the present invention.

FIG. 2 is a data flow diagram that illustrates the interaction that occurs when passing arrays to stored procedures according to the present invention. An array 200 and a pointer 202 to a starting address of the array 200 are stored in the memory 104 of the computer 100. Also included in the memory 104 of the computer 100 is an ADDR function 204 and a Stored Procedure 206. In the preferred embodiment, the array 200 and pointer 202 are defined in VisualBasic; the ADDR function 204 is defined in C; and the Stored Procedure 206 is defined in SQL.

The Stored Procedure 206 is normally invoked for execution by the computer 100 in several steps. First, the types of arguments used by the Stored Procedure 206 have to be described programmatically in an invoking program, and then the arguments are passed by the invoking program to the Stored Procedure 206 according to a standardized interface for the Stored Procedure 206. Of course, in such a scenario, the invoking program must be capable of conforming to the standardized interface for the Stored Procedure 206.

In contrast, the present invention passes array 200 information from to the Stored Procedure 206 by passing a pointer to the array 200, instead of passing the array 200 itself. The pointer to the array 200 is passed to the Stored Procedure in the following manner.

Using a C compiler, the programmer defines the "ADDR" function 204, in a manner similar to that described below:

```
VOID * ADDR(VOID *P)
{
RETURN P;
}
```

While the ADDR function is preferably implemented in the C programming language, it will be recognized that the function may be implemented in any one of a variety of programming languages, such as BASIC, PASCAL, MODULA-2, etc., without loss of generality.

The ADDR function accepts as its input a memory pointer (P) to any variable or data structure. The ADDR function then simply returns the memory pointer passed to it as a return value for a function call. Thus, the return value of the ADDR function can subsequently be used as a global memory pointer in subsequent function calls.

Using the C compiler, the ADDR function is compiled into object code. The object code is then stored in a dynamic link library (DLL), which in the preferred embodiment is identified by "ADDR.DLL". Those skilled in the art will recognize that other names and coding techniques may be used to implement the present invention.

Using a VisualBasic compiler, the programmer creates a VisualBasic program, in a manner similar to that described below:

```
DIM ARRAY( ) AS INTEGER
DECLARE FUNCTION ADDR LIB "ADDR.DLL" (A AS ANY)
AS LONG
DECLARE FUNCTION NEW ALIAS ADDR (A AS ANY) AS LONG
SP1.CALL NEW (ARRAY( ))
```

The VisualBasic program performs whatever functions the programmer desires, including the passing of the ARRAY 200 to the Stored Procedure 206. In order to pass the ARRAY 200, the programmer first defines the "ADDR" function 204 in the VisualBasic program, using the statement: "DECLARE FUNCTION ADDR LIB "ADDR.DLL" (A AS ANY) AS LONG". Thereafter, the programmer defines an alias dynamic link library (DLL) function for the ADDR function, using the statement: "DECLARE FUNCTION NEW ALIAS ADDR (A AS ANY) AS LONG". Then, the programmer invokes the alias DLL function, and through it the ADDR function, using the statement: "SP1.CALL NEW (ARRAY())". The argument for the NEW function is the VisualBasic ARRAY 200 having a start address 202. The NEW function then returns a "handle" for the ARRAY 200, as that term is known in the art. Once the handle for the ARRAY 200 is obtained, the Stored Procedure 206 can be invoked using the returned handle as a parameter, using the statement: "SP1.CALL NEW (ARRAY())". The Stored Procedure 206 known as "SP1" then uses the handle to access the ARRAY 200.

VISUAL BASIC PROGRAMMING FLOW CHART

Figure 3:
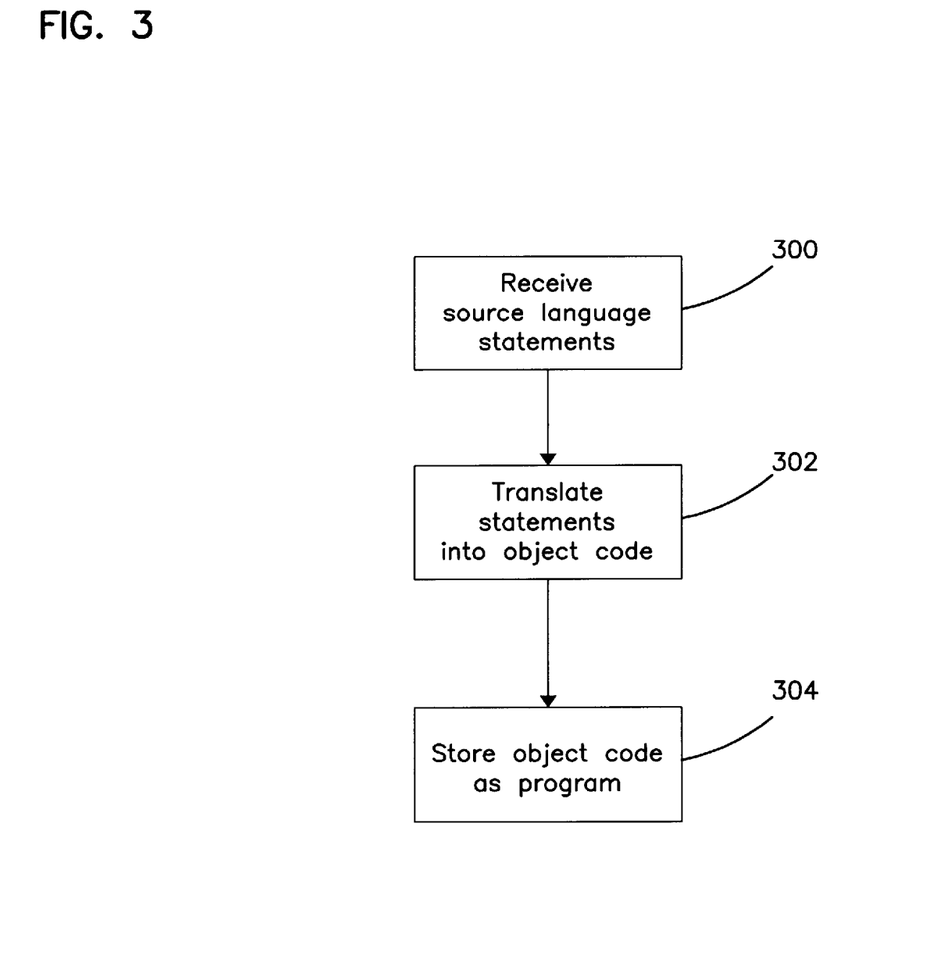
FIG. 3 is a flowchart illustrating the steps necessary to program a VisualBasic program in the computer according to the present invention.

FIG. 3 is a flowchart illustrating the steps necessary to program a VisualBasic program in the computer 100 according to the present invention. Block 300 represents the computer 100 receiving source language statements comprising a VisualBasic program into the memory 104 of the computer 100, wherein the statements comprise whatever functions the programmer desires, including the passing of the ARRAY 200 to the Stored Procedure 206.

As described above, in order to pass the ARRAY 200, the source language statements include the definition of the "ADDR" function 204. Further, the source language statements define an alias dynamic link library (DLL) function for the ADDR function. Then, the source language statements invoke the alias DLL function, and through it the ADDR function, wherein the argument for the alias DLL function is the VisualBasic ARRAY 200 having a start address 202. The alias DLL function then returns a "handle" for the ARRAY 200. Once the handle for the ARRAY 200 is obtained, the source language statements invoke the Stored Procedure 206 using the returned handle as a parameter. The Stored Procedure 206 then uses the handle in access the ARRAY 200.

Following block 300, block 302 represents the computer, via a compiler, translating the source language statements into object code in the memory 104 of the computer 100, wherein the object code is a VisualBasic program. Following block 302, block 304 represents the object code being stored as a program in the memory 104 of the computer 100.

ADDR FUNCTION PROGRAMMING FLOW CHART

Figure 4:
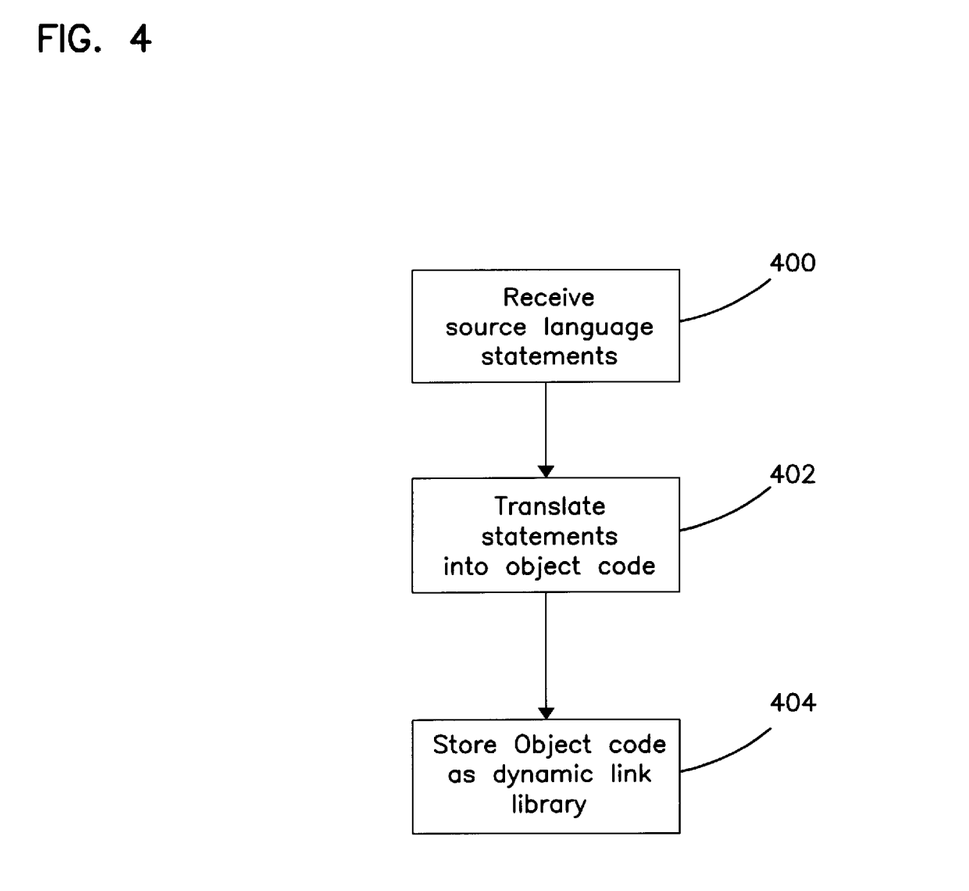
FIG. 4 is a flowchart illustrating the steps necessary to program an ADDR function in the computer according to the present invention.

FIG. 4 is a flowchart illustrating the steps necessary to program an ADDR function in the computer 100 according to the present invention. Block 400 represents the computer 100 receiving source language statements comprising an ADDR function into the memory 104 of the computer 100, wherein the statements comprises a method for obtaining and returning a handle for a passed ARRAY 200. Following block 400, block 402 represents the computer, via a compiler, translating the source language statements into object code in the memory 104 of the computer 100, wherein the object code 28 includes instructions for obtaining and returning a handle for a passed ARRAY 200. Following block 402, block 404 represents the object code being stored as a dynamic link library (DLL) in the memory 104 of the computer 100.

STORED PROCEDURE PROGRAMMING FLOW CHART

Figure 5:
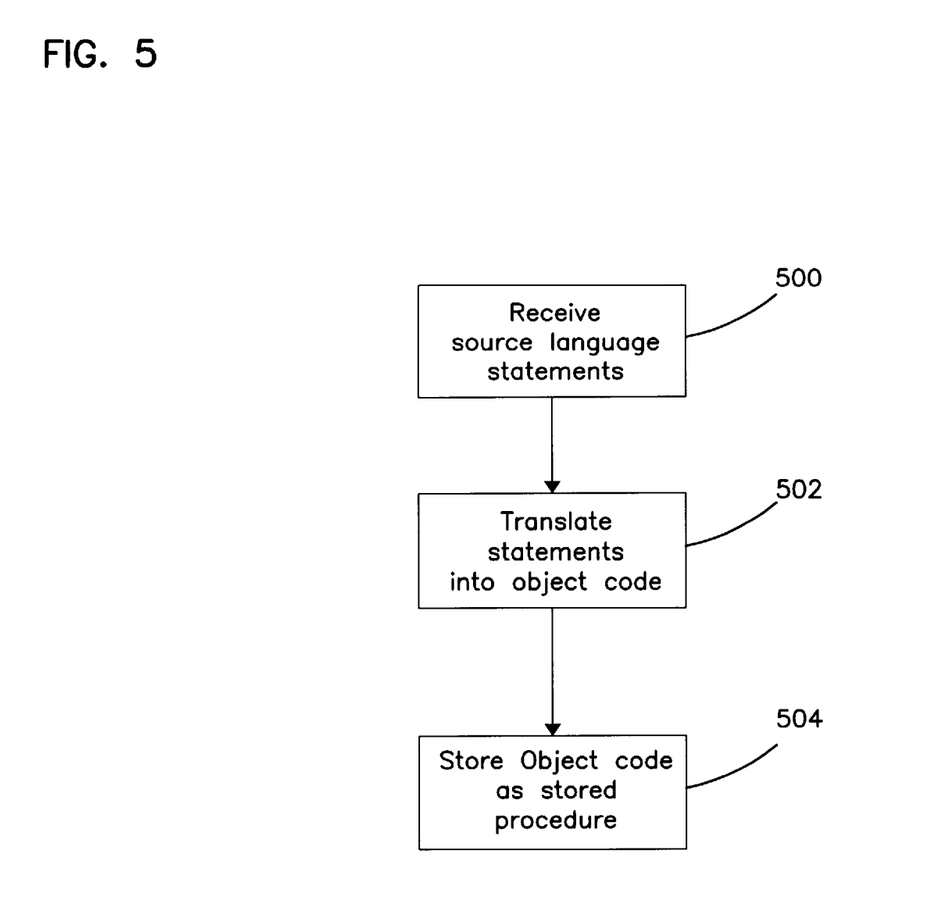
FIG. 5 is a flowchart illustrating the steps necessary to program a stored procedure in the computer according to the present invention.

FIG. 5 is a flowchart illustrating the steps necessary to program a Stored Procedure in the computer 100 according to the present invention. Block 500 represents the computer 100 receiving source language statements comprising a stored procedure into the memory 104 of the computer 100, wherein the statements typically comprise a sequence of SQL statements. Following block 500, block 502 represents the computer 100, via an interpreter or compiler, translating the source language statements into a stored procedure in the memory 104 of the computer 100. Following block 502, block 504 represents the stored procedure being stored in the memory 104 of the computer 100.

EXECUTION FLOW CHART

Figure 6:
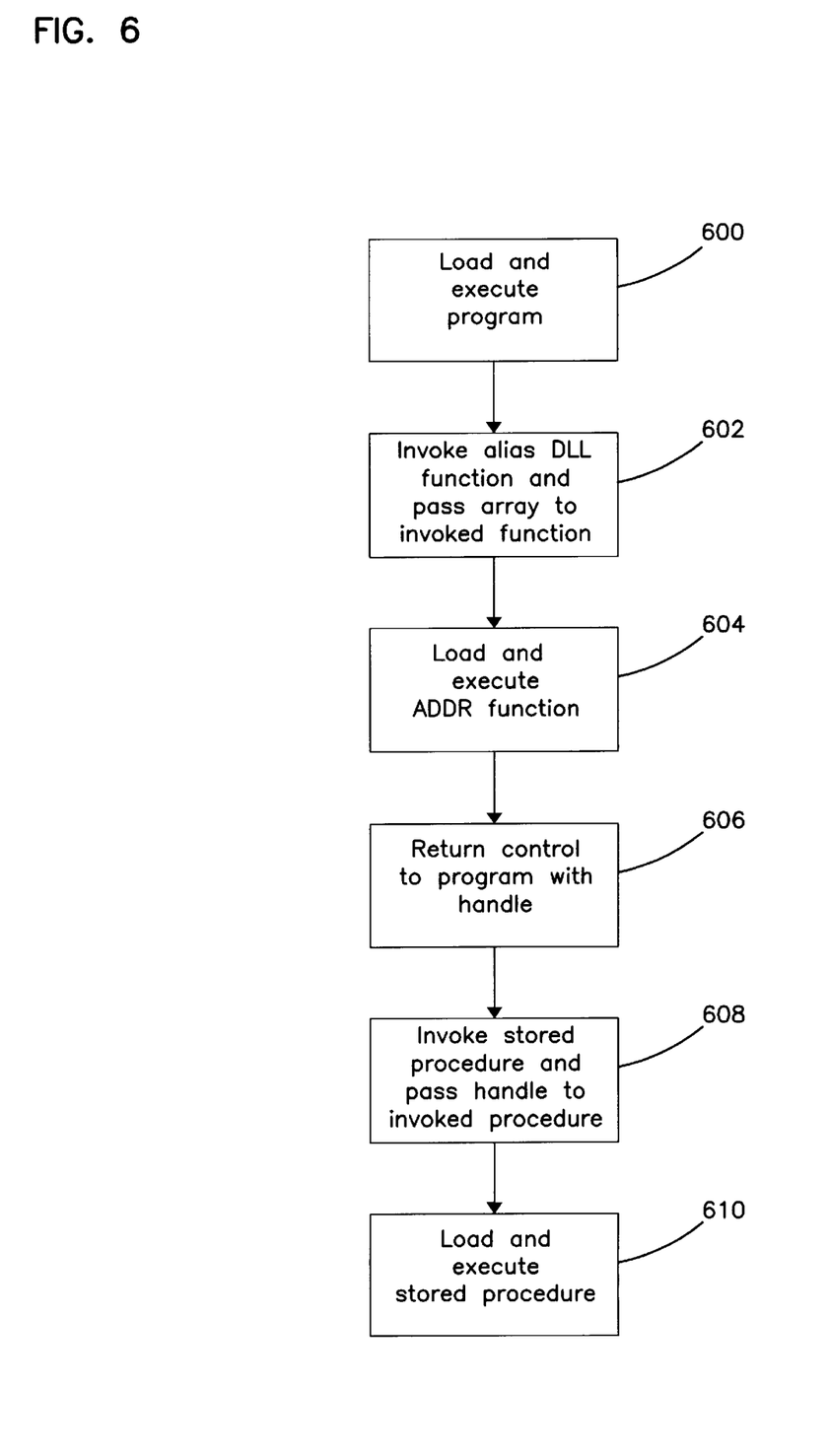
FIG. 6 is a flowchart illustrating the steps necessary for passing of arrays to stored procedures according to the present invention.

FIG. 6 is a flowchart illustrating the steps necessary for passing of arrays to stored procedures according to the present invention. Block 600 represents the computer 100 loading and executing the program. Block 602 represents the computer 100, via the program, invoking the alias DLL function, wherein the ARRAY 200 is passed as an argument to the alias DLL function. Since the function is an alias, this step actually invokes the ADDR function 204. Block 604 represents the computer 100, via the program, loading and executing the invoked ADDR function 204. Block 606 represents the computer 100, via the ADDR function, returning control to the program, wherein the handle for the ARRAY 200 is returned to the program by the ADDR function 204. Block 606 represents the computer 100, via the program, invoking the Stored Procedure 206, wherein the handle for the ARRAY 200 is passed as an argument to the Stored Procedure. Block 608 represents the computer 100 loading and executing the Stored Procedure 206.

CONCLUSION

In summary, the present invention discloses a method, apparatus, and article of manufacture for passing a VisualBasic array argument to an SQL stored procedure executed by a computer. The VisualBasic array is first created in the memory of the computer and comprises an object. The array is then passed to a C or C++ function in the memory of the computer. The function to which the array is passed is declared as an alias for another function within VisualBasic. Execution of the function by the computer returns a handle for the passed array. Finally, the handle is passed to the SQL stored procedure in the memory of the computer, and is accessed by the stored procedure during execution by the computer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of passing an array argument to a stored procedure executed by a computer, comprising the steps of:
    (a) creating the array in a memory of the computer wherein the array is an object;
    (b) passing the array to a function in the memory of the computer, wherein execution of the function by the computer returns a handle for the passed array and wherein the function is an alias for another function in the memory of the computer; and
    (c) passing the handle to the stored procedure in the memory of the computer, wherein execution of the stored procedure by the computer accesses the passed handle.

2. A method of passing an array argument to a stored procedure executed by a computer, comprising the steps of:
    (a) creating the array in a memory of the computer, wherein the array is an object and wherein the array is a VisualBasic array.
    (b) passing the array to a function in the memory of the computer, wherein execution of the function by the computer returns a handle for the passed array: and
    (c) passing the handle to the stored procedure in the memory of the computer, wherein execution of the stored procedure by the computer accesses the passed handle.

3. A method of passing an array argument to a stored procedure executed by a computer, comprising the steps of:
    (a) creating the array in a memory of the computer, wherein the array is an object;

(b) passing the array to a function in the memory of the computer, wherein execution of the function by the computer returns a handle for the passed array and wherein the function is a C function; and (c) passing the handle to the stored procedure in the memory of the computer, wherein execution of the stored procedure by the computer accesses the passed handle.

4. A method of passing an array argument to a stored procedure executed by a computer, comprising the steps of:

(a) creating the array in a memory of the computer, wherein the array is an object;

(b) passing the array to a function in the memory of the computer, wherein execution of the function by the computer returns a handle for the passed array; and (c) passing the handle to the stored procedure in the memory of the computer, wherein execution of the stored procedure by the computer accesses the passed handle and wherein the stored procedure is an SQL stored procedure.

5. An apparatus for passing an array argument to a stored procedure executed by a computer, comprising:

(a) a computer having a memory;

(b) means, performed by the computer, for creating the array in a memory of the computer, wherein the array is an object;

(c) means, performed by the computer, for passing the array to a function in the memory of the computer, wherein execution of the function by the computer returns a handle for the passed array and wherein the function is an alias for another function in the memory of the computer; and (d) means, performed by the computer, for passing the handle to the stored procedure in the memory of the computer, wherein execution of the stored procedure by the computer accesses the passed handle.

6. An apparatus for passing an array argument to a stored procedure executed by a computer, comprising:

(a) a computer having a memory;

(b) means, performed by the computer, for creating the array in a memory of the computer, wherein the array is an object and wherein the array is a VisualBasic array;

(c) means, performed by the computer, for passing the array to a function in the memory of the computer, wherein execution of the function by the computer returns a handle for the passed array; and (d) means, performed by the computer, for passing the handle to the stored procedure in the memory of the computer, wherein execution of the stored procedure by the computer accesses the passed handle.

7. An apparatus for passing an array argument to a stored procedure executed by a computer, comprising:

(a) a computer having a memory;

(b) means, performed by the computer, for creating the array in a memory of the computer, wherein the array is an object;

(c) means, performed by the computer, for passing the array to a function in the memory of the computer, wherein execution of the function by the computer returns a handle for the passed array and wherein the function is a C function; and (d) means, performed by the computer, for passing the handle to the stored procedure in the memory of the computer, wherein execution of the stored procedure by the computer accesses the passed handle.

8. An apparatus for passing an array argument to a stored procedure executed by a computer, comprising:

(a) a computer having a memory;

(b) means, performed by the computer, for creating the array in a memory of the computer wherein the array is an object;

(c) means, performed by the computer for passing the array to a function in the memory of the computer, wherein execution of the function by the computer returns a handle for the passed array; and (d) means, performed by the computer, for passing the handle to the stored procedure in the memory of the computer, wherein execution of the stored procedure by the computer accesses the passed handle and wherein the stored procedure is an SQL stored procedure.

9. A program storage device, readable by a computer, tangibly embodying a program of instructions executable by the computer to perform method steps for passing an array argument to a stored procedure executed by the computer, the method comprising the steps of:

(a) creating the array in a memory of the computer wherein the array is an object;

(b) passing the array to a function in the memory of the computer, wherein execution of the function by the computer returns a handle for the passed array and wherein the function is an alias for another function in the memory of the computer; and (c) passing the handle to the stored procedure in the memory of the computer wherein execution of the stored procedure by the computer accesses the passed handle.

10. A program storage device, readable by a computer, tangibly embodying a program of instructions executable by the computer to perform method steps for passing an array argument to a stored procedure executed by the computer the method comprising the steps of:

(a) creating the array in a memory of the computer, wherein the away is an object and wherein the array is a VisualBasic array;

(b) passing the array to a function in the memory of the computer, wherein execution of the function by the computer returns a handle for the passed array; and (c) passing the handle to the stored procedure in the memory of the computer, wherein execution of the stored procedure by the computer accesses the passed handle.

11. A program storage device, readable by a computer, tangibly embodying a program of instructions executable by the computer to perform method steps for passing an array argument to a stored procedure executed by the computer, the method comprising the steps of:

(a) creating the array in a memory of the computer, wherein the array is an object;

(b) passing the array to a function in the memory of the computer wherein execution of the function by the computer returns a handle for the passed array and wherein the function is a C function; and (c) passing the handle to the stored procedure in the memory of the computers wherein execution of the stored procedure by the computer accesses the passed handle.

12. A program storage device, readable by a computer, tangibly embodying a program of instructions executable by the computer to perform method steps for passing an array argument to a stored procedure executed by the computer the method comprising the steps of:

(a) creating the array in a memory of the computer, wherein the array is an object;

(b) passing the array to a function in the memory of the computer, wherein execution of the function by the computer returns a handle for the passed array; and (c) passing the handle to the stored procedure in the memory of the computer, wherein execution of the stored procedure by the computer accesses the passed handle and wherein the stored procedure is an SQL stored procedure.

* * * * *